(12) United States Patent
Lee

(10) Patent No.: US 6,662,463 B2
(45) Date of Patent: Dec. 16, 2003

(54) TAPE RULE WITH A TAPE OF ENHANCED STIFFNESS

(76) Inventor: Shih-Lin Lee, No. 22, Lane 81, Sec. 2, Tunhwa S. Rd., Taipei City (TW)

( * ) Notice: Subject to any disclaimer, the term of this patent is extended or adjusted under 35 U.S.C. 154(b) by 0 days.

(21) Appl. No.: 10/097,937

(22) Filed: Mar. 15, 2002

(65) Prior Publication Data

US 2003/0172539 A1 Sep. 18, 2003

(51) Int. Cl.⁷ .................................................. G01B 3/10
(52) U.S. Cl. .......................... 33/757; 33/755; 33/771; 33/759; 33/760
(58) Field of Search .................... 33/757, 755, 771, 33/759, 760

(56) References Cited

U.S. PATENT DOCUMENTS

| | | | | |
|---|---|---|---|---|
| 1,828,401 A | * | 10/1931 | Farrand ........................ | 33/771 |
| 2,050,941 A | * | 8/1936 | Farrand ........................ | 33/771 |
| 4,411,072 A | * | 10/1983 | Rutty et al. .................... | 33/757 |
| 4,429,462 A | * | 2/1984 | Rutty et al. .................... | 33/757 |
| 6,324,769 B1 | * | 12/2001 | Murray ......................... | 33/755 |
| 6,367,161 B1 | * | 4/2002 | Murray et al. ................. | 33/757 |
| 6,473,986 B1 | * | 11/2002 | Sun .............................. | 33/757 |

* cited by examiner

*Primary Examiner*—Christopher W. Fulton
*Assistant Examiner*—Amanda J Hoolahan
(74) *Attorney, Agent, or Firm*—Dennison, Schultz & Dougherty

(57) ABSTRACT

The transverse cross section of a tape is cambered into V shape. The tape is 27 mm wide, 0.11 mm thick, and cambered at a height of 6.75 mm at its both ends so as to ensure sufficient stiffness when being pulled up to 10.5 feet from the tape rule housing.

1 Claim, 3 Drawing Sheets

TAPE RULE WITH A TAPE OF ENHANCED STIFFNESS

BACKGROUND OF THE INVENTION

1. Field of the Invention

The present invention relates to tape rule with a tape of enhanced stiffness, and in particular, to a tape with stiffness increased to such an extent that the tape is able to keep straight up to 10.5 feet length without flexing when being drawn out.

2. Description of the Prior Art

The tape rule is a very widely used measurement rule from amateur and professional carpentry to civil and architectural survey work.

To keep reliable accuracy for measuring results, the tape shall be satisfactorily stiff when it is drawn out to a length, for example, about 8.5 feet. In a conventional tape rule, its tape is usually yield to flex when the extracted hanging length exceeds 8.5 feet so that dependable measuring data can not be obtained. There has been a tape rule with a tape of improved stiffness disclosed in the U.S. Pat. No. 6,324,769. The cambered transverse cross sectional surface has the dimension of width 27.94~38.1 mm, thickness 0.114~0.16 mm, cambered height 6.35~10.16 mm. With this structure, the tape can maintain required stiffness up to 10.5 ft extracted length accompanied with extra material and production costs and increased market price in compensation. Besides, excessive tape width causes the user hard to grasp that resulting in inconveniency to regular handling.

In order to solve the above described problems, the present inventor has carried long term theoretical studies and simulating experiments. Based on these studies and researches, the present inventor has come to propose the present invention.

SUMMARY OF THE INVENTION

Therefore, it is an object of the present invention to provide a tape rule with a tape of enhanced stiffness whose tape can be pulled out up to 10.5 feet long in hanging state without loosing its stiffness for measuring accuracy and made with small production cost so as to bring down the market price and stimulate the user's desire to use.

It is another object of the present invention to provide a tape rule with a tape of enhanced stiffness whose tape is ingeniously constructed for easy handling.

For achieving the above objects, the transverse cross section of the tape according to the present invention is configured in a V shape cambered surface of with 27 mm, thickness 0.11 mm, and cambered height measured from both terminals vertically to the tangential plane to the lowest point of the V shape cambered cross sectional surface. The tape is wound back and put away in a housing by a rewinding core spring of width 22 mm, thickness 0.12 mm, and length 4500 mm. With this structure, the whole tape rule is able to maintain perfect stiffness when being extracted up to 10.5 feet long suspending horizontally in the air with less material and production costs than that of a tape rule made according to conventional techniques.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
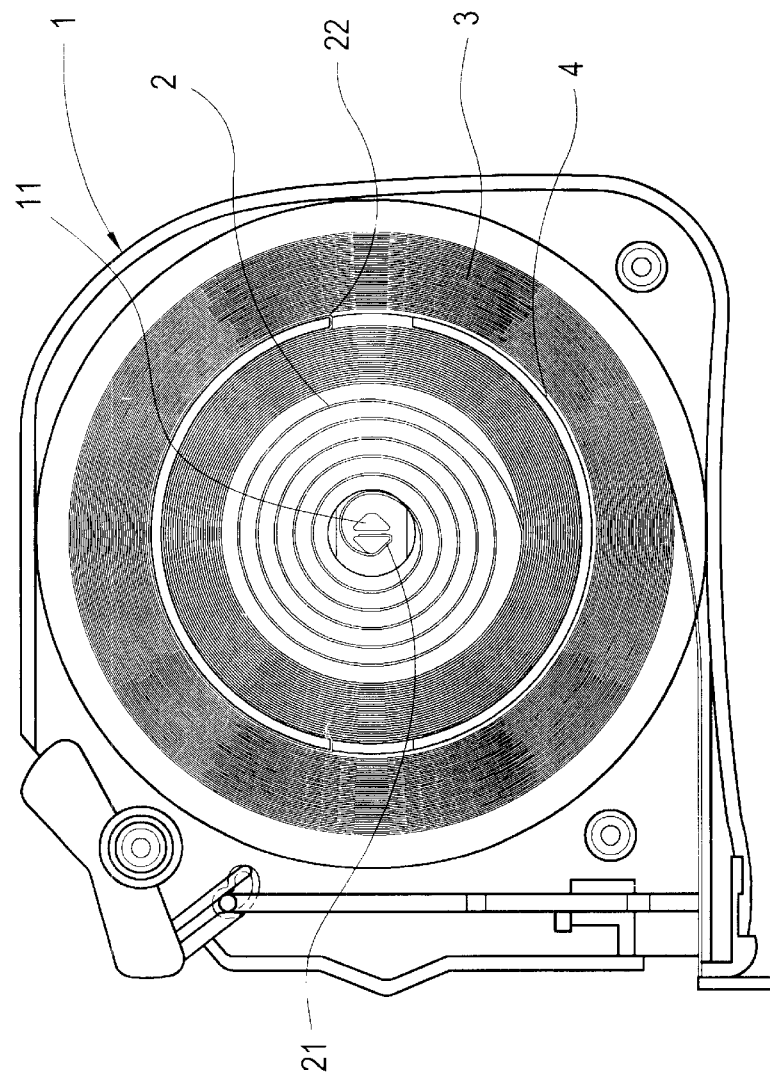
FIG. 1 is an illustrative view of the tape which is wound in the housing according to the present invention.
Figure 2:
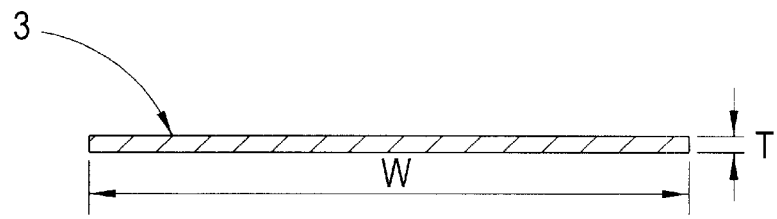
FIG. 2 is the transverse cross sectional view of the tape when it is laid flat.

Referring to FIG. 1 and FIG. 2, the tape rule with a tape of enhanced stiffness according to the present invention comprises a tape rule housing 1, a rewinding core spring 2, and a tape 3.

There is a peg 11 standing at the center of the housing 1. The core spring 2 of width 22 mm, thickness 0.125 mm, and length 4500 mm is wound around the peg 11 with its one end 21 conjoined to the peg 11 and its other end 22 fixed to a protective ring 4 such that the core spring 2 can be spirally settled in the housing 1. The wound core spring 2 has a total diameter 14 mm.

The tape 3 has a series of graduations printed on its surface thereof. The tape 3 is spirally wound and accommodated in the housing 1 with its one end secured to the protective ring 4 at the position facing against the end 22 of the core spring 2 where the core spring 2 is fixed to the protective ring 4. The other end of the tape 3 remains free for pulling.

Figure 3:
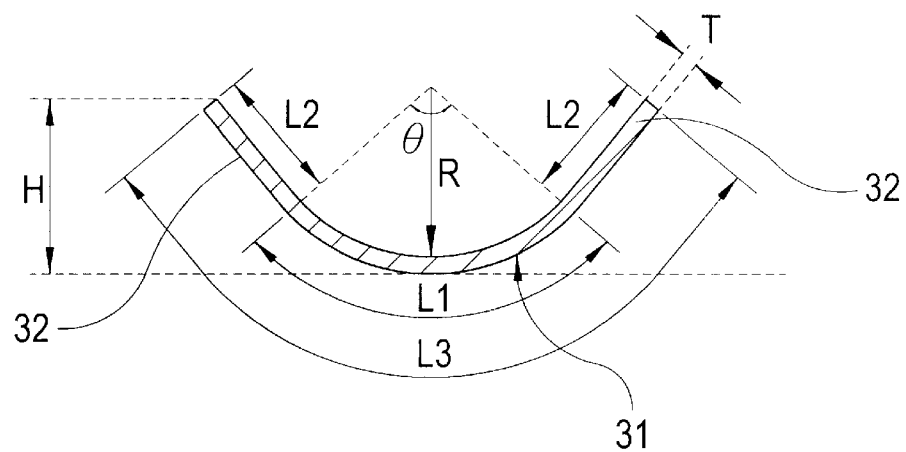
FIG. 3 is the transverse cross sectional view of the tape configurated in a V shape cambered surface according to the present invention.
Figure 4:
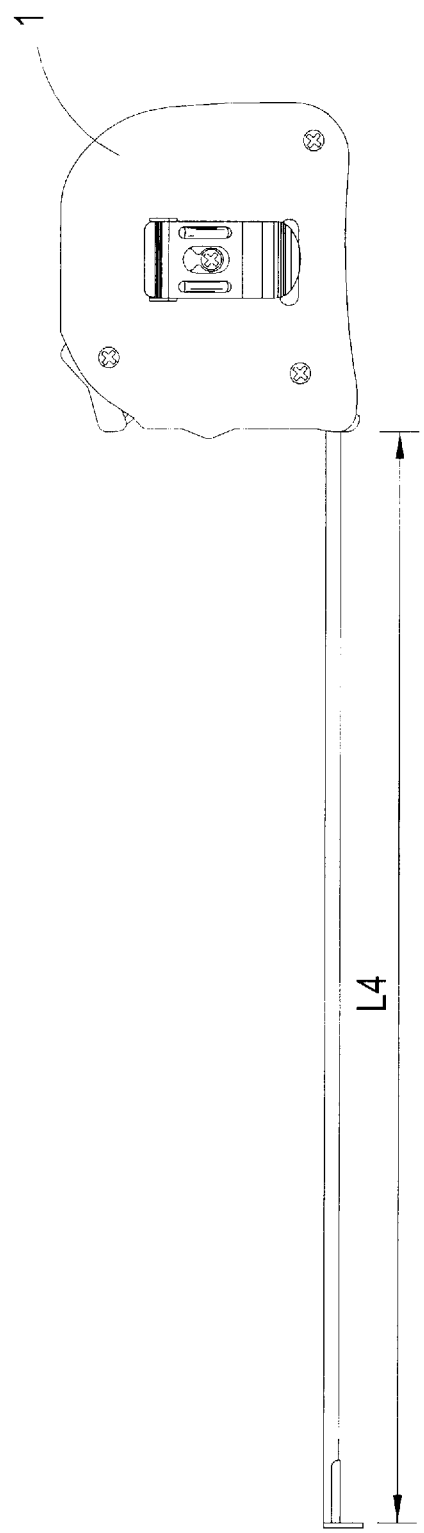
FIG. 4 is an illustrative view showing the tape of the present invention is pulled out of the housing ready for measurement work.

Referring to FIGS. 2 and 3, the tape 3 having a width 27 mm, and a thickness 0.11 mm, is bent to configurate into a V shape cambered transverse cross sectional surface so as to ensure sufficient stiffness when it is pulled 10.5 feet long out of the housing 1 the cambered surface consists of two subsurfaces, a first surface 31 with length L1=13.12 mm has angle of curvature $\theta=82°$ C., and the radius R of curvature (distance from center of curvature to the first surface 31) is 10 mm. A second surface 32, whose length L2=6.5 mm, is perpendicular to the first surface 31. The total length L3 of the cambered surface is thus 26.12 mm. With this structure, the cambered height H(vertical distance from either end of the erected V cross section formed of the two surfaces to the tangential plane to the bottom lowest point of the cambered surface) of the tape 3 is 6.75 mm. The tap 3 accompanied with the above described core spring 2 is then able to be pulled out a length L4=10.5 feet out of the housing 1 without loosing its required stiffness for practical use.

Table 1 is data obtained by repeated experiments about the tape fabricated according to the present invention, it is attached hereinafter for reference.

It emerges from the description of the above embodiment that the invention has several noteworthy advantages, in particular:

1. The tape formed according to the present invention can be pulled out up to 10.5 feet long in suspending state without loosing its required stiffness for practical measuring work and made with small production cost so as to bring down the sale price and promote marketability.
2. The tape of the present invention is constructed so ingeniously that causes it easy to handle.

Those who are skilled in the art will readily perceive how to modify the invention. Therefore, the appended claims are to be construed to cover all equivalent structures which fall within the true scope and spirit of the invention.

What is claimed is:

1. A tape rule with a tape of enhanced stiffness comprising:

A tape rule housing (1) having a peg provided at the center of said housing thereof;

a rewinding core spring for rewinding a tape into said housing, being spirally accommodated therein with its one end conjoined to said peg, while the other end fixed to a protective ring; and said tape having a series of graduations on the surface thereof being spirally wound and accommodated in said housing with its one end secured to said protective ring at the position facing against the end of said core spring (2) fixed to said protective ring, the other end being remained free for pulling;

wherein said tape is 27 mm wide, 0.11 mm thick and cambered its both ends at a height of 6.75 mm so as to ensure its stiffness when being pulled out 10.5 feet out said housing wherein said rewinding core spring is 22 mm wide, 0.125 mm thick and 4500 mm long and the total diameter of said rewinding core spring when in spirally wound state is 14 mm and wherein the cambered height from either end of an erected V cross section formed of first and two second surfaces of the transverse cross section of the tape to the tangential plane to the bottom lowest point of the cambered surface of the tape is 6.75 mm, and said first surface being approximately perpendicular to a portion of said second surface; and wherein angle of curvature of said first surface is 82° and the length of said first surface is 13.12 mm, the radius of curvature of said first surface is 10 mm, the length of two second surface is 6.5 mm each and wherein the total length of said first and second surfaces is 26.12 mm.

* * * * *